5 Sheets—Sheet 1.

P. P. MAST & C. O. GARDINER.
Grain-Drilling and Seeding-Machine.

No. 205,971. Patented July 16, 1878.

Witnesses:
Will W. Dodge
Donn P. Twitchell

Inventor:
P. P. Mast
C. O. Gardiner
By Dodge & Son
Attys.

5 Sheets—Sheet 2.
P. P. MAST & C. O. GARDINER.
Grain-Drilling and Seeding-Machine.
No. 205,971. Patented July 16, 1878.
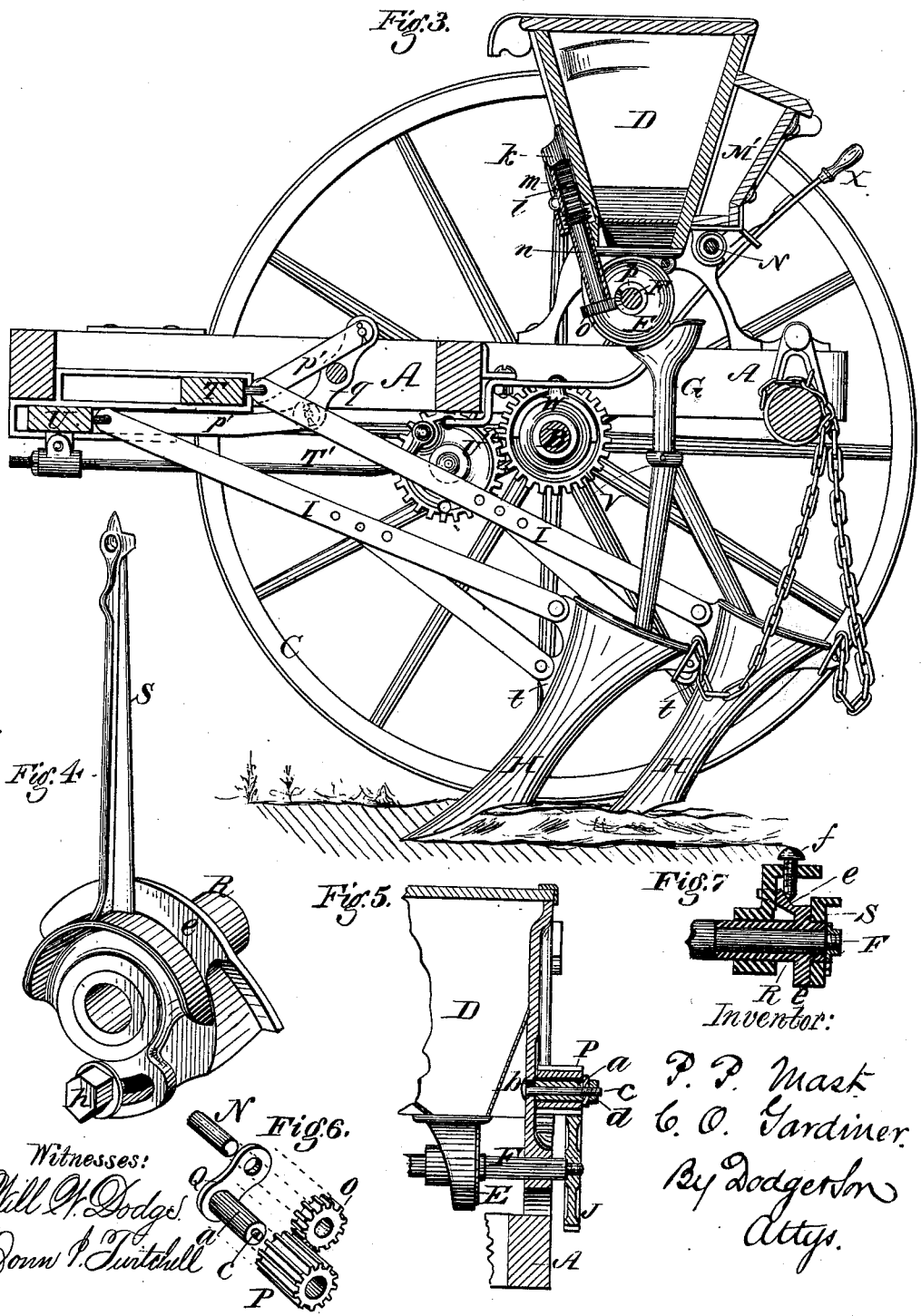
Witnesses:
Will W. Dodge
Donn P. Mitchell
Inventor:
P. P. Mast
C. O. Gardiner
By Dodge & Son
Attys.

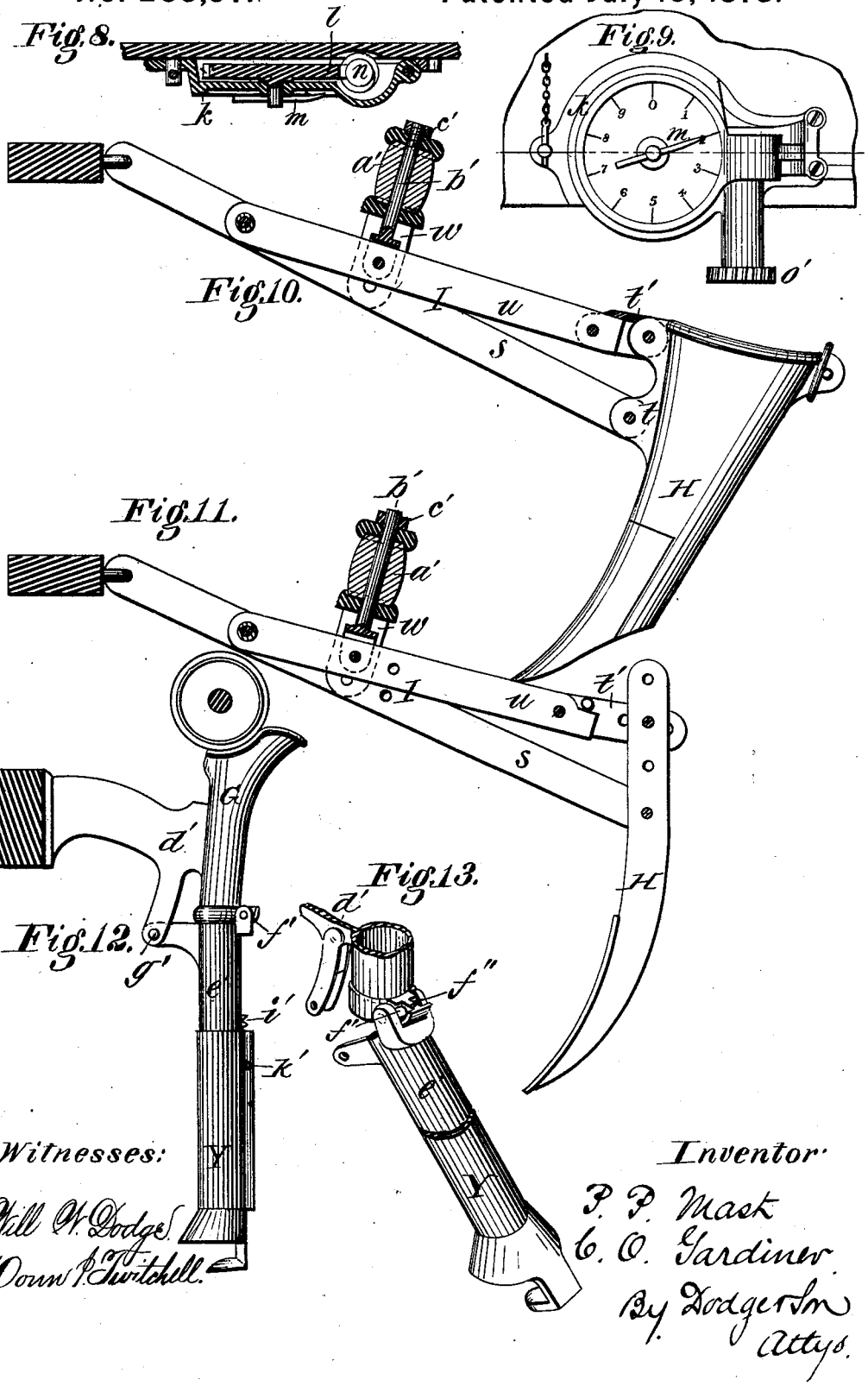

5 Sheets—Sheet 4.
P. P. MAST & C. O. GARDINER.
Grain-Drilling and Seeding-Machine.
No. 205,971. Patented July 16, 1878.
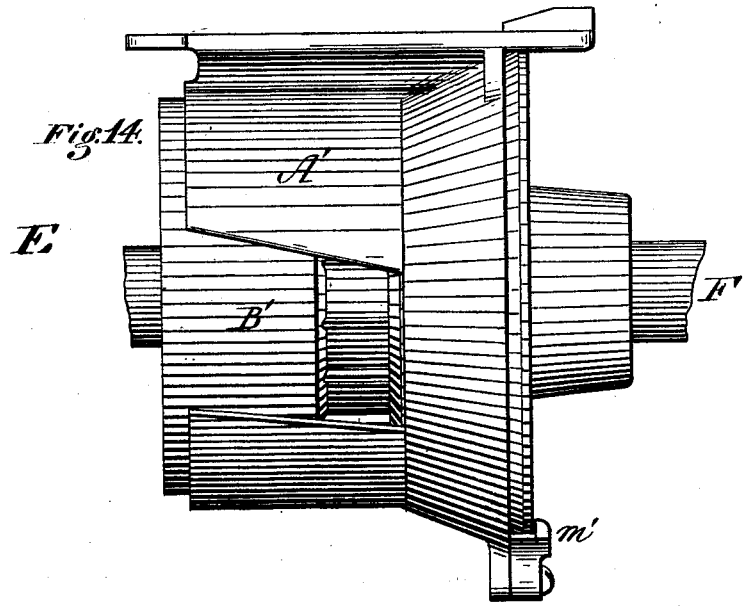
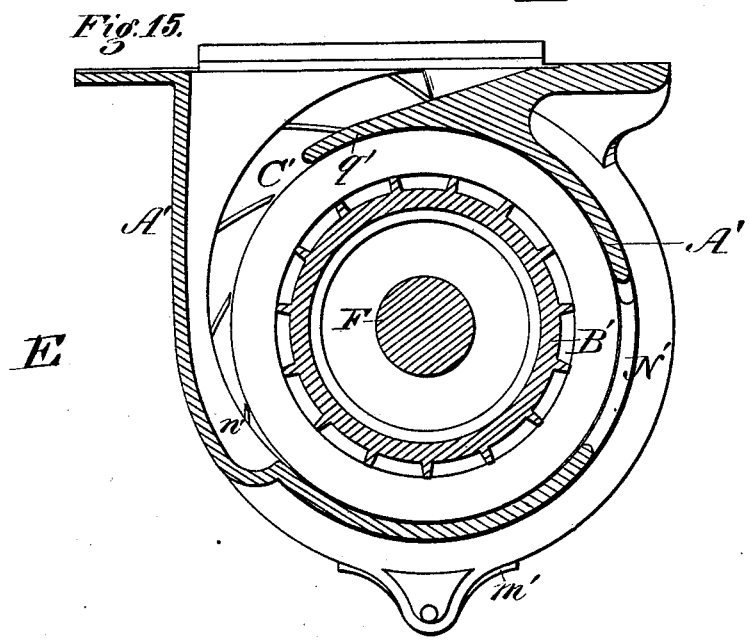
Witnesses:
Will H. Dodge
Donn I. Twitchell
Inventor:
P. P. Mast
C. O. Gardiner
By Dodge & Son
Attys.

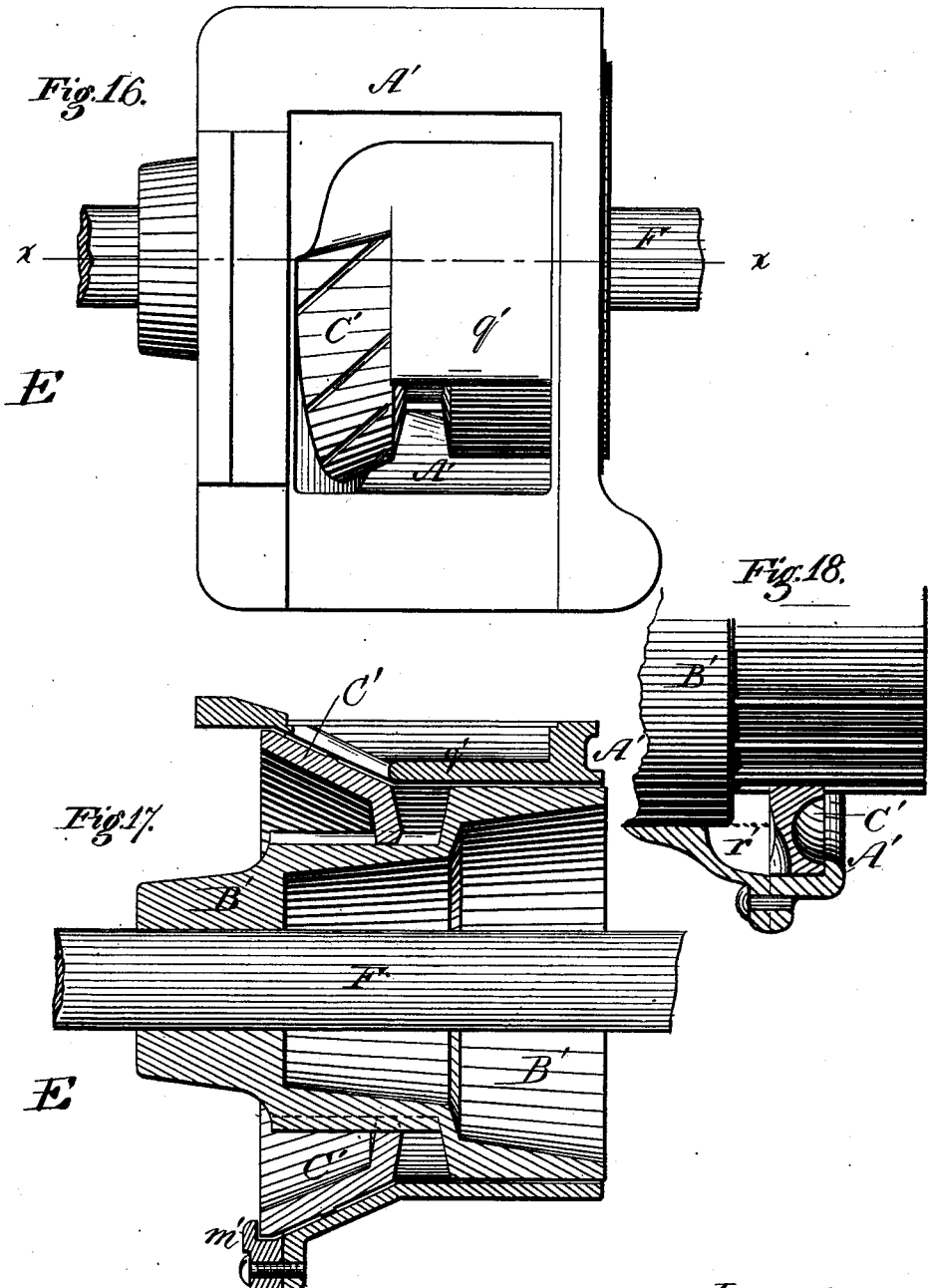

UNITED STATES PATENT OFFICE.

PHINEAS P. MAST AND CHARLES O. GARDINER, OF SPRINGFIELD, OHIO.

IMPROVEMENT IN GRAIN DRILLING AND SEEDING MACHINES.

Specification forming part of Letters Patent No. 205,971, dated July 16, 1878; application filed September 21, 1877.

*To all whom it may concern:*

Be it known that we, PHINEAS P. MAST and CHARLES O. GARDINER, of Springfield, in the county of Clarke and State of Ohio, have invented certain Improvements in Grain Drilling and Seeding Machines, of which the following is a specification:

Our invention relates to that class of wheeled machines in which the seed is fed from a hopper or box by a series of rotary feeding devices, and delivered into and through a series of hoes or drill-teeth attached to beams or drag-bars; and the improvements consist in screwing one of the feed-driving pinions to its shaft, so that it will unscrew when the machine is moved backward, and then run forward again as the machine is advanced and commence the feeding at the point at which it ceased; in mounting a pinion by which the grass-seeding devices are actuated on a peculiar movable support, so that it may be readily thrown into and out of action; in a peculiar arrangement and construction of devices for moving the feed-shaft endwise to regulate the feed; in a peculiar feeding device, which may be adjusted to vary the rate of feed; and in other features of minor importance, which will be hereinafter described.

Figure 1:
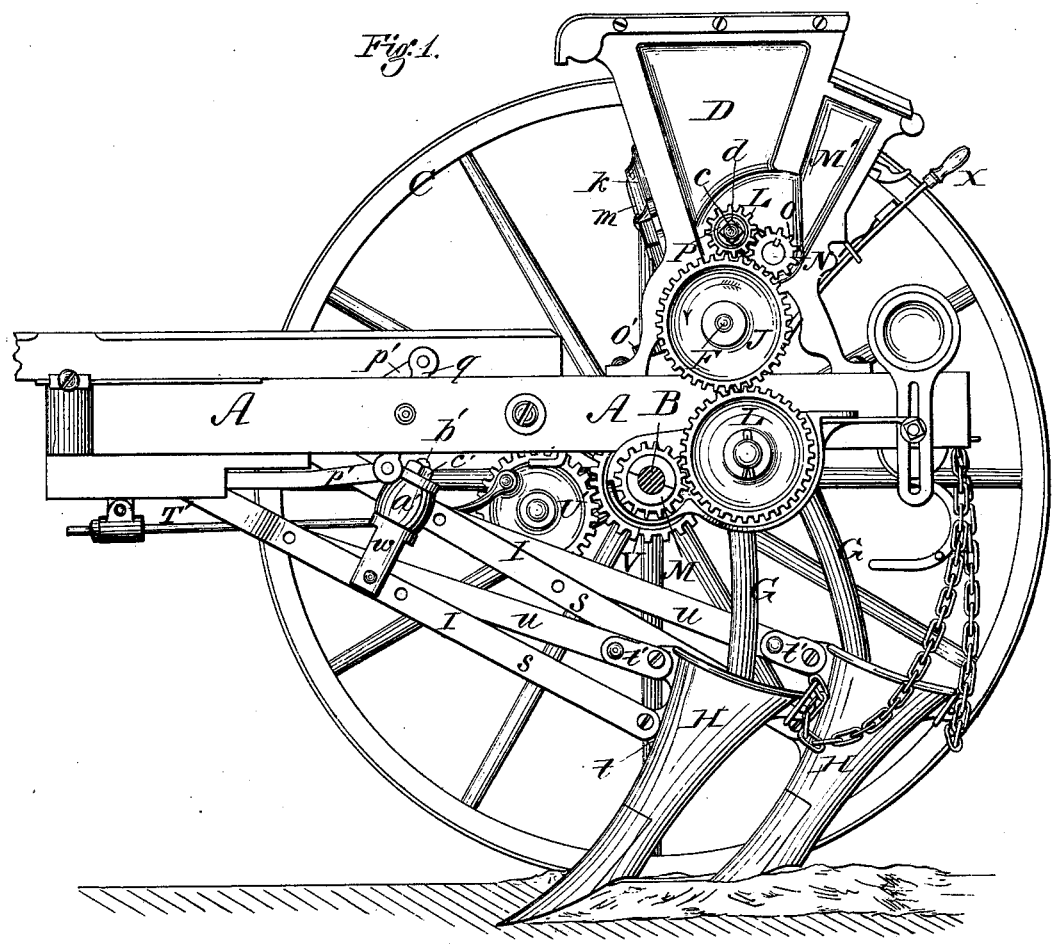
Figure 2:
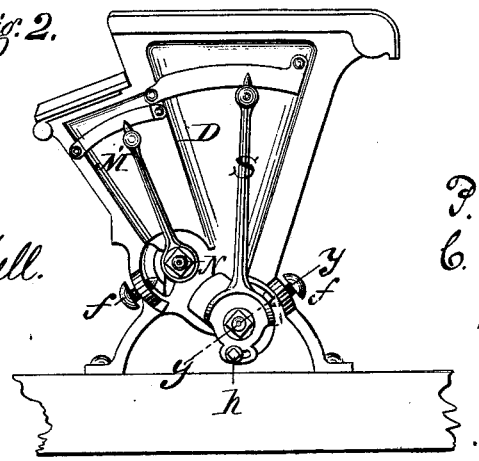

Figure 1 represents a side elevation of our machine; Fig. 2, an end view of the hopper, taken from the opposite side of the machine; Fig. 3, a longitudinal vertical section of the machine; Fig. 4, a perspective view of the index-lever, by which the feeding devices are regulated; Fig. 5, a vertical section through one end of the hopper, illustrating the devices by which the pinion for driving the grass-seeding mechanism is supported; Fig. 6, a view, showing the gearing and its supporting devices by which the grass-seeding mechanism is driven; Fig. 7, a cross-section on the line *y y* of Fig. 2, showing the manner in which the mechanism for moving the feed-shaft endwise is arranged; Figs. 8 and 9, views illustrating the construction and arrangement of the surveyor; Figs. 10 and 11, views illustrating, in section, the construction of the drag-bars and the yielding hoes or teeth connected thereto; Figs. 12 and 13, views illustrating the construction of the scattering or broadcasting tubes, the manner in which they are attached, and the mode of adjusting them; Figs. 14, 15, 16, and 17, views showing in detail the construction of the grain-feeding devices, of which there is a series, duplicates of each other; Fig. 18, a sectional view, showing a modification of the cup or case of the feeder.

A represents the rectangular main frame of the machine, and B a transverse shaft or axle, mounted and arranged to rotate in boxes on the under side of the frame, and mounted at its ends in the two large traction-wheels C, one of which is connected rigidly therewith.

D represents the hopper or grain-box, extending transversely across the frame; E E, the series of feeding devices, mounted on the transverse shaft F; G, conductors, to carry the grain from the feeding devices to the hoes; H, the hoes or drill-teeth; I, the beams or drag-bars to which the hoes are attached.

As shown in Fig. 1, the feed-shaft F is provided with a driving-pinion, J, at one end, which pinion is in its turn driven by a pinion, L, which latter receives its motion from a pinion, M, mounted on the main axle and clutched fast to one of the main wheels C, so that, as the machine is moved forward, the pinion J and the feed-shaft are turned forward in the direction indicated by the arrow. In order to prevent the feeding devices from being turned backward when the machine is moved backward, and to keep them out of action while the machine is being advanced to the point at which it ceased to feed, we simply screw the pinion J upon the end of its shaft and up against a shoulder thereon, a thread being cut on the shaft and a corresponding thread cut in the wheel, as shown in Fig. 5.

While the machine is moving forward the pinion is turned up against the shoulder, and carries the shaft and feeding devices forward; but whenever the machine is moved backward and the motion of the driving-pinions reversed, the pinion J, being driven backward, unscrews and permits the feed-shaft to remain at rest, the screw being of such length that the pinion can make a number of turns and the machine move back a considerable distance without disconnecting the pinion from the shaft.

When the machine is again moved forward the pinion J is turned forward again without rotating the shaft or feeding devices until it rests against the shoulder, which occurs at the instant when the machine reaches the point at which it stopped feeding. It will thus be seen that the very simple expedient of screwing the pinion on the feed-shaft prevents the feeding devices from being turned backward, and also prevents the machine, after being moved backward, from feeding again while being advanced to the point at which its advance stopped.

We do not claim, broadly, the idea of screwing a wheel upon a shaft or arbor, but it will be at once perceived that by thus arranging a pinion which drives the feeding devices of a grain-drill new and peculiar results are attained and a great advantage gained in the operation of the machine.

On one side of the grain-hopper there is mounted, as usual, a grass-seed hopper, M', provided with a series of feeding devices mounted on and driven by a shaft, N, which is provided on its end with a pinion, O, driven by a long pinion, P, from the driving-wheel or pinion of the feed-shaft, as shown in Figs. 1 and 5.

In order to admit of the pinion P being readily thrown into and out of action, it is mounted, as shown in Figs. 1, 5, and 6, on a journal, a, formed on one end of a swinging arm, Q, which has its opposite end journaled upon the grass-seeder shaft N, so that by swinging the arm upward the pinion P is thrown out of gear with the wheel or pinion J.

For the purpose of fastening the arm Q and holding the pinion P in or out of gear, the end of the grain-hopper, as shown in Fig. 5, is provided with a curved slot, b, through which and the journal a a bolt, c, is passed, and provided on the outer end with a washer and a nut, d. The slot in the hopper admits of the bolt moving with the arm and pinion, and the nut, when tightened up, clamps the arm rigidly against the end of the hopper. The washer and nut also serve to retain the pinion on the journal, which is made of such length that the tightening up of the nut does not prevent the free rotation of the pinion.

The grain-feeding devices E are of that class which may be caused to feed with greater or less rapidity by moving their driving-shaft F endwise. Two devices have been most generally employed for giving the end movement to the shaft—one consisting of a small sleeve with a thread or rib of necessarily great and objectionable obliquity, and the other an ordinary screw, which is objectionable for the reason that the necessary index arm cannot be used thereon.

In order to overcome these difficulties we employ the device represented in Figs. 2, 4, and 7, consisting of a sleeve, R, mounted loosely on the end of the feed-shaft, and provided with an actuating-arm, S, and with an enlarged plate or disk, e, having an oblique or inclined edge, which bears between a shoulder on the metal end of the grain-hopper and a pointed screw, f, inserted through one of the hopper legs, as clearly represented. By moving the arm S the sleeve and its disk are rotated upon the shaft and the inclined edge of the disk moved between the screw and the shoulder, the effect of which is to move the sleeve and the feed-shaft endwise, the sleeve being held from moving endwise on the shaft by a shoulder on one side and a nut on the other, as clearly shown in Fig. 7.

By providing the sleeve with the enlarged oblique plate or disk e we are enabled to give the shaft the greatest end movement required by moving the arm or lever S through a small arc, so that it may be used directly in connection with a graduated plate, as an index or indicator, by which to regulate the rate of feed and the amount sown per acre, and this without giving the disk such an obliquity as to render its adjustment difficult or troublesome.

The use of the conical screw to form a bearing for the edge of the disk admits of compensation being made for wear, and of a close fit being maintained at all times between the disk and its bearings.

In order that the sleeve and disk, the indicator-arm, and the indicator-plate, over which the arm moves, may be readily adjusted and fixed to correspond with the adjustment of the feeding devices, the indicator-arm is made separate from the sleeve and disk, and journaled upon the former, and secured by a screw, h, to the disk, as clearly shown in Fig. 4, a slot being made in the arm to permit its adjustment in relation to the sleeve and disk.

It is to be understood that the adjustment of the arm on the sleeve is to be made when the machine is set up for use, and is not under ordinary circumstances to be disturbed afterward, being entirely distinct from the ordinary adjustment to vary the rate of feed.

The surveying attachment, to record and indicate the amount of land in which grain has been drilled, is clearly represented in Figs. 1, 3, 8, and 9. It consists, primarily, of a metal case, k, having a graduated dial-face, containing a worm-wheel, l, having a journal which protrudes through the face of the case, and has passed through its end a pin, m, which serves the double purpose of a hand or pointer and of holding the wheel in the case. A depending tubular neck cast on the case k contains an upright shaft, n, the upper end of which bears a worm, engaging in the wheel l, while the lower end carries a worm-wheel, o', actuated by a worm, p, on the feed-shaft, as shown. The case k is hinged at one side to a plate secured on the front of the main hopper, and is fastened in an operative position by a pin and staple or equivalent fastening, so that it may be readily swung forward out of action when not to be used or when the indicator needs resetting.

By arranging the surveyor as above and driving it directly from the feed-shaft, the machine is rendered very simple, and the surveyor caused to stop and start with the feeding devices without the employment of the usual extra parts to secure that end.

The drag bars or beams of the machine are attached to two transverse sliding bars, T and U, every alternate beam being attached to one bar and the remaining beams to the other, so that by shifting the bars the hoes or drill-teeth may be set in a straight or a zigzag line, as required, in the ordinary and well-known manner. The two bars T and U are connected by arms or links $p'$ to opposite ends of levers $q$, mounted on a transverse rock-shaft, whereby the simultaneous and equal movement of the bars in opposite directions is secured, as in other machines hitherto in use.

Hitherto the movement of the cross-bars and hoes has been secured by means of hand-levers, cranks, and other devices actuated by the attendant of the machine. In order to avoid the labor required on the part of the attendant in adjusting the hoes, we connect the sliding bars, or such other devices as may be employed to carry the drag bars or beams, by any suitable intermediate mechanism with the main wheels or any part of the gearing of the machine, so that the hoes will be shifted thereby, thus throwing the labor on the team instead of upon the attendant.

The devices used to secure the shifting of the hoes may be modified as fancy may dictate or circumstances require, provided they are under the control of the attendant, so that he may throw them into and out of action at will.

As shown in Fig. 1, the arrangement consists merely of a pitman, T', extending from one of the sliding cross-bars to a crank-pin on the side of a gear-wheel, U', which is mounted at one side of the main frame and driven by a wheel, V, mounted on the main shaft or axle, so that motion is communicated from the axle through the wheels U' V and the pitman directly to the sliding bars, one half-revolution of the wheel U' setting the drill-teeth in line, and the next half-revolution setting them out of line.

The wheel V is mounted loosely on the shaft or axle, and driven by a clutch, W, controlled by a hand-lever, X, by which it may be thrown into and out of action at the will of the attendant.

The forward end of the clutch-operating lever is provided with a lip or point, and the wheel U' provided with two holes or recesses to receive the same, in order to hold the wheel from turning and retain the hoes in the straight or the irregular line, as required. When the lever throws the clutch into action it at the same time unlocks the wheel U', and the hoes immediately change rank. The instant the hoes reach the desired position the lever is shifted to disengage the clutch, whereupon its end enters the wheel U' and locks the parts in position.

The manner in which the drag-bars are constructed and the yielding hoes connected thereto will be readily understood upon reference to Figs. 1, 10, and 11. Each bar consists mainly of two parallel bars, $s$, pivoted at their rear ends to an ear, $t$, on the hoe or tooth, some distance below its top, and of a middle bar, $u$, pivoted at its forward end between the side bars $s$, and connected at its rear end by a link, $t'$, to an ear on the top of the tooth or hoe. A stirrup, $w$, secured to the side bars, arches over the middle bar $u$, and supports a rubber spring, $a'$, through which latter there passes a vertical rod, $b'$, the upper end of which is provided with a nut, $c'$, resting on the spring, while its lower end is pivoted to the middle bar $u$.

The joint uniting the middle bar with the link $t'$ is of such character that it admits of their being bent downward, but not upward. Whenever the strain or resistance against the point of the hoe becomes excessive, the strain on the link causes the same to press down the middle bar $u$, which, overcoming the resistance of the spring, permits the hoe-point to swing backward. When the resistance to the hoe is removed from its point the spring causes it to resume its operative position, and the knuckle-joints between the link and the middle bar prevent the hoe or tooth from yielding when the machine is moved backward, or a backward strain brought against the hoe or tooth, as often happens when turning the machine.

The various features hereinbefore described are applicable alike to machines for drilling and those for sowing broadcast.

When the machine is intended for sowing broadcast alone, we make use of the peculiar conducting and scattering device represented by Y, Figs 12 and 13. The upper tubular portion of the device, which receives the grain from the feeder, has an arm, $d'$, which is secured to the frame, and holds said part rigidly and immovably in position. The lower tubular portion of the device $e'$ is connected to the upper part by means of interlocking lugs $f'$ $f''$ on the rear side and a wooden break-pin, $g'$, in front, the break-pin being passed through the adjoining ends of arms formed on the two parts, as shown. When the lower part is thus connected to the upper, it will break the pin and swing backward in the event of its meeting a rigid obstruction, and consequently we are enabled to extend the conductor down with safety nearly to the surface of the ground—a construction which is very desirable, in order that the grain may not be blown and drifted about in windy weather.

The conductor will be provided at the bottom with the scattering-lip shown, or any other ordinary or suitable form of lip.

As clearly shown in Fig. 13, the lugs on the two parts of the scatterer are made to hook together in such manner that the lower part can swing backward without being disconnected.

In order that the length of the scatterer and the distance of its mouth from the ground may be varied, the lower portion may be made in two parts, arranged to slide telescopically one over the other, as shown in Fig. 12, the inner part being provided with exterior teeth $i$ to receive a fastening-pin, $k'$, passed transversely through the outside tube or part, as shown.

The form of the two parts, the teeth, and the fastening device may be modified, provided the telescopic arrangement is retained; but the construction shown is considered the most desirable for ordinary use.

The construction of the feeding devices will be readily understood on referring to Figs. 14, 15, 16, and 17. They belong to that class which consist of a horizontal feed-roll of greater diameter at one end than at the other, mounted and arranged to be adjustable endwise in a cup or case, with its smaller end extending through a rotary ring or rosette, which is mounted in and closes one side of the cup or case.

In the drawings, in which E indicates the feeder as a whole, A represents the cup or case; B′, the feed-roll, and C′ the ring or rosette. The roll has its large end made of a smooth cylindrical form, but its smaller end provided with longitudinal ribs or teeth, to effect the feeding of the grain, as usual. The rosette is made with an inclined or flaring inner face, which is exposed, as shown, this construction giving an increased feeding-surface in proportion to the diameter of the rosette, and causing the latter to feed the grain downward with certainty and regularity. The rosette is seated in a corresponding flared seat in the side of the cup, and is held in place by seating its upper edge in a notch or recess in the top of the cup, and by a plate, $m'$, secured over its lower edge and against the side of the cup by a screw.

The cup closely encircles the large end of the roll and the rosette on the under and rear sides; but at the front a pocket or enlargement, $n'$, is made in the cup to admit of the grain passing down freely, the lower end of the pocket terminating abruptly, as shown in Fig. 15, in order to form a cut-off against the smooth large end of the roll, and to prevent the grain from being cut and crushed thereby.

The discharge-opening N′ is made in the rear side of the cup, above the bottom, as usual. In the top of the case there is a rigid lip or guard, $q'$, extending over forward, in the manner shown, to prevent the grain from flowing backward and escaping over the top of the roll when it is at rest. As shown in Figs. 15, 16, and 17, the lip or guard $q'$ is cut away above the rosette in such manner as to leave the top of the same exposed, in order that it may serve to agitate and insure the feeding of the mass of grain which rests directly upon it. When the top of the rosette is thus exposed there is no danger of the grain choking and failing to feed down, as frequently happens in other feeders.

The grain passage or channel through which the grain passes to the outlet is formed by or exists between the ribbed portion of the roll and the inner circumference of the cup or case, the rosette on one side and the annular radial face or shoulder of the roll on the other side, as shown. By moving the roll endwise the distance between its shoulder and the rosette, and thereby the width of the grain-passage, may be increased or diminished at will, and the feeder caused to feed with greater or less rapidity, as desired. While it is preferred to make the rosette with the flaring or inclined face, it may be made with a vertical face, with or without teeth thereon.

The best results are attained when the diameter of the rosette is greater than that of the cylindrical part of the wheel, so that it will extend above the lip or guard $q'$. When the rosette is made with a vertical face, having teeth thereon, a groove or channel is formed in the bottom of the cup, as shown at $r'$, Fig. 18, to admit the grain to the teeth and secure a perfect flow when the rate of feed is reduced to its minimum.

It will be seen that by making the rosette of greater diameter than the large end of the cylinder and providing the channel $r'$, the roll has an annular feeding-face on its side, outside of the large end of the roll, when the latter is forced inward, as represented by the dotted lines in Fig. 18.

Having thus described our invention, what we claim is—

1. In a grain drilling or seeding machine, a driving-wheel screwed directly upon the feed-shaft, so that it can unscrew when turned backward, substantially as shown, and for the purpose described.

2. In the feed-operating mechanism or gearing of a grain drill or seeder, a wheel screwed upon its shaft or bearing, so that when turned backward it will unscrew and permit the feeding devices to remain inoperative, and that it will then permit the machine to advance again to its original position before commencing to actuate the feeding devices.

3. In a grain-drill, the combination of rotary grain and grass seeding shafts provided with pinions and an intermediate adjustable pinion, which may be thrown into and out of action at will, in order that the grass-seeder may be driven from the grain-feeding shaft or the latter operated alone at will, as shown and described.

4. In combination with the main feed-pinion J and grass-seeder pinion O, the swinging arm Q, journaled on the grass-seeder shaft, the pinion J, mounted on the arm Q, and the bolt $c$, arranged to lock the parts in position, as shown and described.

5. In combination with the pinions J O, swinging arm Q, and pinion P, the slotted grain-hopper end and the bolt for securing the swinging arm, as shown.

6. In combination with the feed-shaft F, the rotary sleeve R, secured against end movement thereon, and provided with the enlarged oblique disk or flange $e$, working between fixed bearings.

7. In combination with the sleeve R, having the oblique or inclined disk or flange $e$, a rigid bearing on one side of the same, and the adjustable screw $f$, bearing against the opposite side of the same.

8. In combination with the sleeve R, the slotted arm or lever S, journaled thereon, and the lateral bolt $h$, inserted, as shown, to secure the parts together face to face.

9. In combination with the axle, having the loose wheel V and the clutch W mounted thereon, and the wheel provided with the notches or stops, the hand-lever connected with the clutch and provided with the lip to enter the notches, substantially as shown.

10. A continuous broadcasting-tube, divided at or near its middle into two sections, the upper section provided with the lugs $f'$ and arm $d'$, and the lower section provided with lugs and a pin-receiving arm, as shown, whereby the two sections may be united directly to each other.

11. In a broadcasting tube or conductor for seeding-machines, the combination of a vertically-sliding mouth or end section, the body-section provided with teeth $i'$ and having the mouth-section mounted thereon, and a transverse fastening-pin, $k'$, substantially as shown.

12. In a force-feed for grain drills and seeders, the combination of a cup or case, a feed-roll, substantially such as shown, and a ring or rosette having, substantially, its entire top exposed to agitate and move the grain resting thereon.

13. The combination of the feed-roll, having ends of different diameters, the rosette $C'$, and the cup or case $A'$, provided with the lip or guard $q'$, extending forward over the grain channel or passage beyond the vertical axis of the roll, but cut away on one side, in order to expose the top of the rosette and permit the inside face of the latter to extend above it, as shown.

14. In combination with the feed-roll of two different diameters and the ring or rosette $C'$, the feed cup or case having the channel $r'$ in its interior, adjacent to the face of the ring.

15. In a force-feed for grain-drills, the combination of a cup or case containing a feed-roll and a lip or guard, $q'$, with a rotary ring or rosette, having its upper edge extended above the level of the lip and exposed to the superincumbent grain.

16. In an adjustable force-feed of the character shown and described, an inclined or beveled ring or rosette, $C'$, as shown.

PHINEAS P. MAST.
C. O. GARDINER.

Witnesses:
JAMES B. CHRISTIE,
T. R. PRESCOTT.